United States Patent
McLarty, III et al.

(10) Patent No.: US 6,571,833 B1
(45) Date of Patent: Jun. 3, 2003

(54) OPTIC CABLE CONDUIT INSERT AND METHOD OF MANUFACTURE

(75) Inventors: George C. McLarty, III, Greenville, SC (US); Derek S. Kozlowski, Spartanburg, SC (US); Robert M. Smith, Duncan, SC (US); J. Robert Reynolds, Spartanburg, SC (US)

(73) Assignee: Milliken & Company, Spartanburg, SC (US)

(*) Notice: Subject to any disclaimer, the term of this patent is extended or adjusted under 35 U.S.C. 154(b) by 0 days.

(21) Appl. No.: 09/616,864

(22) Filed: Jul. 14, 2000

(51) Int. Cl.[7] ............................. F16L 11/00; D05B 1/00
(52) U.S. Cl. ..................... 138/116; 138/124; 138/128; 138/158; 138/169; 112/475.01; 112/470.05; 112/470.33; 112/155; 112/163; 112/68; 83/29; 83/44; 385/112; 385/110; 385/114; 174/95
(58) Field of Search .................. 138/104, 116, 138/124, 128, 158, 169; 156/92, 271, 93; 83/29, 44; 112/475.01, 470.05, 470.33, 155, 163, 68; 385/110, 112, 114; 174/95; 254/134.3 FT

(56) References Cited

U.S. PATENT DOCUMENTS

| | | | |
|---|---|---|---|
| 2,585,054 A | 2/1952 | Stachura | 174/36 |
| 2,742,388 A | 4/1956 | Russell | 154/110 |
| 2,916,055 A | 12/1959 | Brumbach | 138/87 |
| 3,486,957 A | * 12/1969 | Fish et al. | |
| 3,524,921 A | 8/1970 | Wolf | 174/70 |
| 3,856,052 A | 12/1974 | Feucht | 138/119 |
| 3,939,875 A | 2/1976 | Osborn et al. | 138/178 |
| 3,996,084 A | * 12/1976 | Holmes | 156/93 |
| 3,996,968 A | 12/1976 | Bergman et al. | 138/118 |
| 4,478,661 A | 10/1984 | Lewis | 156/92 |
| 4,582,093 A | 4/1986 | Hubbard et al. | 138/111 |
| 4,585,034 A | 4/1986 | Hubbard et al. | 138/111 |
| 4,619,291 A | 10/1986 | Shirian | 138/109 |
| 4,674,167 A | 6/1987 | Hubbard et al. | 29/401.1 |
| 4,707,074 A | 11/1987 | Heywood | 350/96.23 |
| 4,741,593 A | 5/1988 | Fochler | 350/96.23 |
| 4,745,238 A | 5/1988 | Kotthaus et al. | 174/101.5 |
| 4,793,594 A | 12/1988 | Kumpf | 254/134.3 |
| 4,836,968 A | 6/1989 | Cakmakci | 264/177.19 |
| 4,862,922 A | * 9/1989 | Kite, III | 138/128 |
| 4,976,290 A | 12/1990 | Gelin et al. | 138/141 |
| 5,029,815 A | 7/1991 | Kumpf | 254/134.3 |

(List continued on next page.)

FOREIGN PATENT DOCUMENTS

| | | |
|---|---|---|
| DE | 1 671 869 | 9/1967 |
| DE | 299 10 196 U 1 | 6/1999 |

Primary Examiner—James Hook
(74) Attorney, Agent, or Firm—Terry T. Moyer; Thomas L. Moses

(57) ABSTRACT

A conduit sleeve structure for use with fiber optic cables, coaxial cables and the like includes a pair of adjacent strip-shaped layers of flexible material that are joined along their longitudinal edges to define a channel through which the cable can extend longitudinally through the innerduct structure between the layers. The adjacent layers have differing widths between their longitudinal edges, whereby the wider layer bulges away from the narrower layer to impart an open configuration to the channel. It has been found that the conduit sleeve structure may be manufactured more efficiently and inexpensively if multiple sheets and pull cords are stacked and arranged in such a way that multiple conduit sleeve structures may be manufactured simultaneously in a parallel arrangement. The method of manufacturing the conduit sleeve structures includes feeding several stacked sheets through a folding machine or mechanism, a stitching machine, and then a slitting machine. This method allows the sleeve members to be separated into individual units, or multiple units as desired. In a preferred embodiment, four stacked sheets are used, which ultimately provides three cells or chambers per conduit sleeve.

41 Claims, 2 Drawing Sheets

U.S. PATENT DOCUMENTS

| | | | |
|---|---|---|---|
| 5,034,180 A | 7/1991 | Steketee, Jr. | 264/516 |
| 5,074,527 A | 12/1991 | Kumpf | 254/134.3 |
| 5,180,458 A | 1/1993 | White | 156/87 |
| 5,388,616 A * | 2/1995 | Muller et al. | 138/104 |
| 5,391,838 A | 2/1995 | Plummer, III | 174/36 |
| 5,442,136 A | 8/1995 | Allen | 174/95 |
| 5,503,695 A | 4/1996 | Imoto et al. | 156/71 |
| 5,536,461 A | 7/1996 | King et al. | 264/209.3 |
| 5,538,045 A | 7/1996 | Piotrowski et al. | 138/147 |
| 5,587,115 A | 12/1996 | Allen | 264/1.24 |
| 5,601,671 A * | 2/1997 | Speich | 156/88 |
| 5,698,056 A | 12/1997 | Kamiyama et al. | 156/218 |
| 5,908,049 A | 6/1999 | Williams et al. | 138/125 |
| 6,010,652 A | 1/2000 | Yoshida | 264/103 |
| 6,093,474 A * | 7/2000 | Sironi | 428/156 |
| 6,240,968 B1 * | 6/2001 | Bigonzi-Jaker et al. | 138/115 |
| 6,304,698 B1 * | 10/2001 | Morris | 138/115 |

* cited by examiner

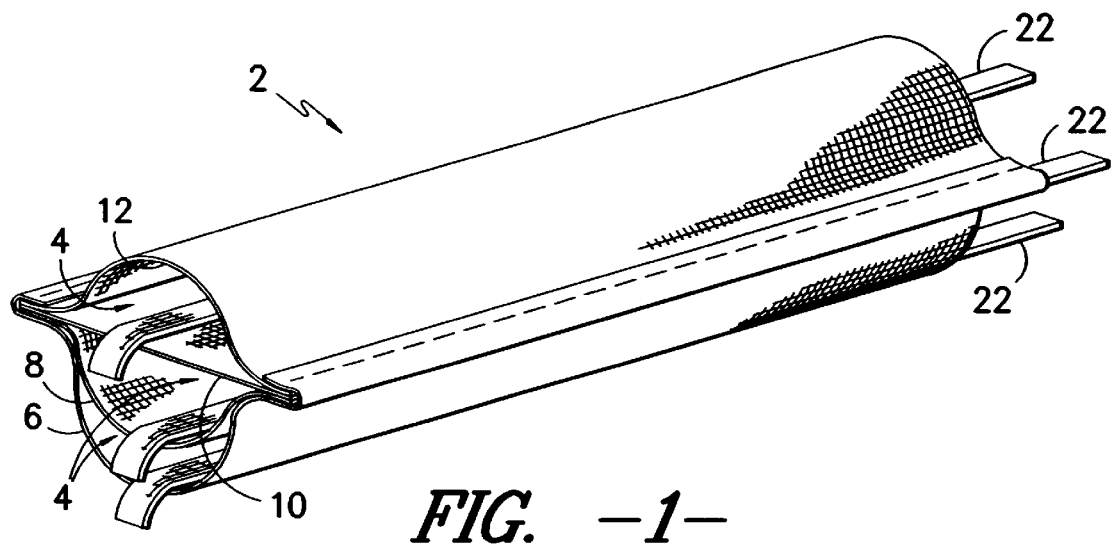
FIG. -1-
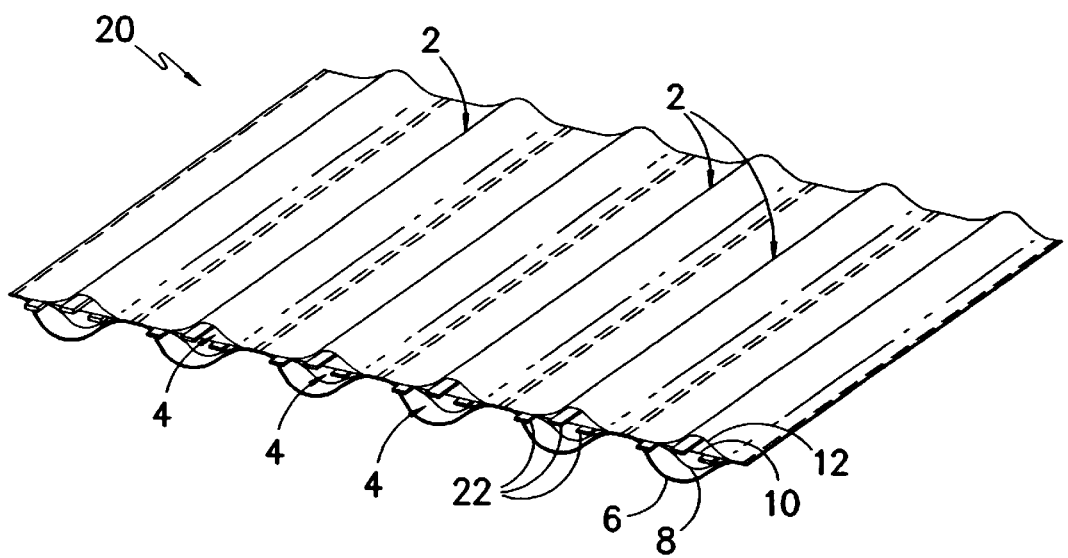
FIG. -2-

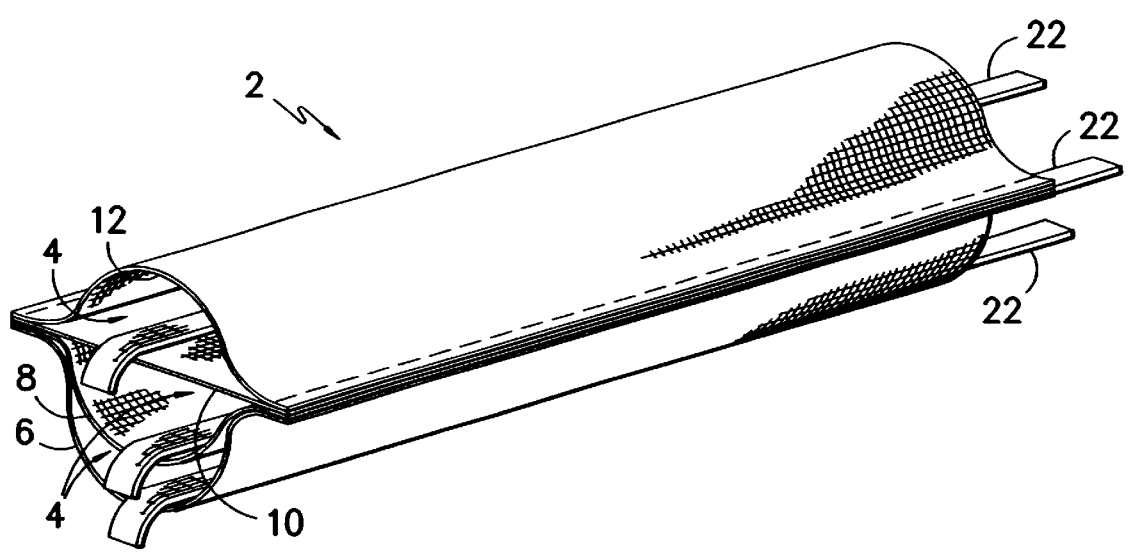
FIG. -3-

OPTIC CABLE CONDUIT INSERT AND METHOD OF MANUFACTURE

BACKGROUND OF THE INVENTION

1. Field of the Invention

The present invention generally relates to tubular conduit of the type that might be employed for the housing of underground cables, such as fiber optic cable, coaxial cable, or the like. More particularly, the present invention relates to a partioning device that may be inserted into such a conduit such that the conduit is divided into separate chambers or cells and a method of manufacturing such a device.

Cable, such as fiber optic communication cable, is often buried underground in great lengths. It is known in the art to bury the cable in the ground so that the area above ground is not cluttered with the cable and its respective support apparatus. Furthermore, by positioning the cable underground, it is more protected from the weather and other potentially damaging circumstances.

It is also known in the cable art to position the cable within a conduit in order to more fully protect the cable in the ground. The conduit is often formed from lengths of polyvinyl chloride tubing or the like, which is laid in the ground. A rope is then blown through the conduit, and the rope in turn is attached to one end of the cable. By pulling the rope, the cable is drawn through the conduit. Once in place within the conduit, the cable is protected from damage that may be caused by weather, water and the like.

It has been found that certain rodents will sometimes gnaw through an underground conduit. Hence, much underground conduit is employed which has a diameter of two inches or more, which is large enough to impede damage from most rodents. While such conduit provides excellent protection for cable, there is also much unused or "dead" space within such a conduit. With the advent of fiber optic cables, which may be only a half-inch or less in diameter, the majority of the cross-sectional area of the average conduit is dead space.

After a conduit is in place, it may be subsequently desired to run a second cable through the conduit. As such, it would be desirable from a cost and time standpoint to make use of the dead space within an existing conduit, rather than lay a new length of conduit. However, it has been found that it is difficult to merely insert a second cable into a conduit that already contains a first cable. When a rope is blown into a conduit already containing a cable, or a second cable is "snaked" through the conduit, they are often impeded by the first cable, making it impossible to insert the second cable.

There exists a product that overcomes some of the above-mentioned obstacles. A single sleeved innerduct structure includes a pair of adjacent strip-shaped layers of flexible textile material that are joined along their longitudinal edges to define a channel through which the cable can extend longitudinally through the innerduct structure between the layers. The adjacent layers have differing widths between their longitudinal edges, whereby the wider layer bulges away from the narrower layer to impart an open configuration to the channel. A need exists, therefore, for a method of inexpensively and efficiently manufacturing such a flexible conduit partition device. Further, in some applications it is desirable to provide a multi-sleeved conduit partition device, where each sleeve includes a plurality of cells for receiving cables and the like.

2. Description of the Prior Art

All patents cited herein are incorporated by reference in their entirety.

U.S. Pat. No. 5,587,115, issued to Allen, is directed to a method of manufacturing a conduit assembly with a floating divider by extruding a casing through a die while at the same time feeding a web member into the casing as it is being extruded to form a plurality of chambers. If the conduit assembly is manufactured with a line, such as a rope or a cable, the rope and/or cable is likewise fed into the casing adjacent to the web member into one or both of the chambers.

U.S. Pat. No. 4,836,968, issued to Cakmakci, is directed to a method of making a fiber optic duct insert by continuously extruding plastic material into a multi-chambered conduit insert including at least two spaced apart longitudinally extending substantially parallel first and second chambers. The cross-sectional configuration of each of the chambers is defined by generally parallel inner and outer side walls joined at one edge thereof by a base wall and joined in an opposite edge thereof by a top wall. A hinge portion connects adjacent edges of the inner walls and the base walls of the chambers together. Opposite ends of the inner walls are spaced farther apart than the adjacent ends of the inner walls in order to expose the exterior surfaces of the inner walls to a cooling medium during the manufacturing process.

U.S. Pat. No. 4,582,093, issued to Hubbard, discloses a method of making a fiber optic duct insert by utilizing a plastic extrusion process to produce a multi-chambered conduit insert which can be utilized to convert a single chambered conduit into a multi-chambered conduit. In particular, the conduit insert includes a plurality of cooperating longitudinally extending walls having curved outer surface portions and defining a plurality of parallel spaced apart coextensive chambers. In the preferred embodiment of the invention, two identical conduit inserts are disposed in back-to-back relationship and form an insert assembly for insertion into the single chambered conduit.

Other patents that demonstrate the state of the art with respect devices that facilitate the placement of multiple cables within a single conduit are as follows:

| U.S. Pat. No. | Inventor |
| --- | --- |
| 4,619,291 | Shirian |
| 4,793,594 | Kumpf |
| 5,029,815 | Kumpf |
| 5,074,527 | Kumpf |
| 5,442,136 | Allen |

One problem associated with many of these devices is that they are mostly extruded plastic products, which do not bend or twist very well. It is difficult to force a semi-rigid, plastic structure into a rigid pipe or tube, particularly one that already contains a cable. Also, the speed of installation of the rigid divider is severely limited by the heat and resistance caused by friction. A flexible, multi-celled textile sleeve conduit overcomes the above problems, and a method for efficiently and inexpensively manufacturing the product is thus desired. Further, a multi-sleeved conduit containing a plurality of cells per sleeve is desirable for receiving a larger bundle of cables, as well as a method for making such a device.

OBJECTS OF THE INVENTION

Accordingly, it is an important object of the present invention to provide a method for efficiently and inexpensively manufacturing a flexible, multi-celled innerduct structure for fiber optic cables, coaxial cables, and the like.

It is another important object of the present invention to provide a method for manufacturing a flexible innerduct structure having a pull cord or tape inserted and slidably disposed therein during the manufacturing process.

Yet another important object of the present invention is to provide a series of flexible, multi-celled innerduct sleeve structures in a parallel configuration, so that each sleeve structure may be individually separated from the others, or combinations of two or three (or more) sleeves may remain in parallel configurations for desired applications, as well as a method for manufacturing such a device.

Still another important object of the present invention is to provide an automated method for manufacturing a flexible, multi-celled cable conduit structure that is biased toward an expanded passageway configuration, but is also collapsible in a rolled up configuration.

Another important object of the present invention is to provide a flexible, multi-celled cable conduit structure and a method for commercially manufacturing the same, which overcomes some of the problems associated with other multi-chambered conduit structures and their methods of manufacture.

BRIEF DESCRIPTION OF THE DRAWINGS

These and other features, aspects, and advantages of the present invention will become better understood with regard to the following description, appended claims, and accompanying drawings where:

FIG. 1 is a perspective view of a flexible, multi-celled cable conduit sleeve;

FIG. 2 is a perspective view of a series of flexible, multi-celled conduit sleeves manufactured in parallel in accordance with the present invention; and FIG. 3 is a perspective view of a flexible, multi-celled cable conduit sleeve having even, flush longitudinal edges.

DETAILED DESCRIPTION

Referring now to FIG. 1, a flexible multi-celled cable conduit 2 suitable for use as a single innerduct conduit sleeve structure for fiber optic cables, coaxial cables or the like, is shown. This embodiment of the structure is disclosed and claimed in U.S. patent application Ser. No. 09/400,778, which is incorporated herein by reference in its entirety. The conduit structure defines a plurality of channels 4 that are formed by interconnected layers of fabric 6, 8, 10, 12. In the first embodiment of the invention, the structure has three channels 4 formed by the above noted layers, which are interconnected at their opposite longitudinal side edge portions by having the edge portions of the lower layer 6 overlap the edge portions of the other layers. The layers are either sewn or connected by other suitable methods, such as ultrasonic welding or adhesive, connecting the layers together. It can be seen from FIG. 1 that the opposite longitudinal side edge portions of the lower strip are folded over those of the other strips and are sewn to form the structure shown.

Turning now to FIG. 2, an alternate embodiment of the conduit structure 20 is shown in accordance with the present invention. It has been found that the conduit structure may be manufactured more efficiently and inexpensively if multiple sheets and pull cords 22 are stacked and arranged in such a way that multiple conduit structure sleeves may be made simultaneously in a parallel arrangement, as shown.

FIG. 2 shows such an embodiment, where the sleeve members 2 are interconnected in parallel relation. This embodiment allows the sleeve members to be separated into individual units, or multiple units as desired. After separation, the longitudinal edges of the conduit sleeve are slit so that each layer is flush with the others (FIG. 3), as opposed to the embodiment shown in FIG. 1, where the lower layer wraps around and back over the edges of the other layers.

The method of manufacturing the embodiment shown in FIG. 2 includes feeding several stacked sheets 6, 8, 10 and 12 through a folding machine or mechanism, a stitching machine, and a slitting machine. In a preferred embodiment, four stacked sheets are used, which ultimately provides three cells 4 or chambers per conduit sleeve 2. It should be understood, however, that any number of sheets may be used in order to provide the desired number of cells per conduit sleeve.

It is also contemplated, in an alternate embodiment, that a single sheet of material may be folded to form the plurality of layers for the final product, rather than utilizing separate, stacked sheets of material. The entire final product may be manufactured from a single sheet of material, if desired.

In preferred embodiment of the manufacturing process, the stacked sheets are first transported through a folding mechanism, which positions one sheet taut in a transverse direction. The other sheets are folded to create essentially longitudinal ridges or waves across the transverse direction of the material. These ridges are portions of the sheet material that are forced to bulge away from the taut sheet at the center point on the ridge, ultimately forming longitudinal chambers or cells within each conduit sleeve. The folding machine feeds pull tapes or cords 22 into each cell created by the ridges, so that each cell ultimately includes a pull tape in slidable relation.

An optional step in the manufacturing process is to provide a suitable adhesive along the longitudinal contact lines between the ridges. This step provides an adhesive layer for bonding all layers together in a longitudinal direction between the two longitudinal stitching lines (which are not yet present in the manufacturing process), where the innerduct liners will be slit into separate units or sleeves. This arrangement provides a finished selvage on either side of each sleeve after the slitting step, in order to prevent unraveling or fraying of the material.

After the ridges have been formed and at least the first portions of the pull tape inserted, the stacked material is fed into a stitching machine such as a Maliwatt by Karl Mayer. Between each ridge, two seams are sewn longitudinally along the ridge base, preferably about ½ inch apart. The seams hold the ridges in place in their open configuration, as shown in FIG. 2. In an alternate embodiment, the layers of material may be held together by other means rather than stitching, including means such as adhesive, hot melt, ultrasonic welding, or any other suitable means including combinations thereof.

After stitching, the assembled material is slit either into individual strips or multiple parallel strips as desired. The material is slit between the two stitches, so that each conduit structure includes one seam on each longitudinal side thereof. If another means is used for attaching the layers together, it is important that the slitting step not compromise the seam on either side of the conduit sleeve structure. The object of this manufacturing process is to produce multiple parallel strips of conduit structure that may be separated as necessary without compromising the structural integrity of the conduit sleeve and/or cells. It may be desirable to slit the material to produce single sleeve units, or alternatively, it may be desirable to slit the material into double sleeve units, triple sleeve units, or the like. The preferred slitting method is rotary shearing, and alternate methods useful for the slitting operation include ultrasonic, hot knife, rotary knife, and the like.

Alternatively, the assembly of parallel sleeves may be perforated between sleeves, which obviates the need for the slitting step. The perforations allow the sleeves to be separated in any configuration, including a single sleeve configuration, a double sleeve configuration, and so on. This separation step may be performed in the field, if necessary, so that a decision regarding the desired number of sleeves may be made after the manufacturing process has been completed.

In a preferred embodiment, after the slitting step the conduit sleeve structure is rolled onto a roll for transport and storage. The preferred structure of the conduit sleeves allows the sleeve to be pressed into a flat configuration on the roll, but will emerge from the roll in an open celled configuration. Other means may be employed for collecting the conduit sleeves for transport and storage, including boxes, reels and the like.

Another option is to provide a coding or identification means for identifying the separate cells within the conduit sleeve. It is important to be able to identify one cell from another when attempting to pull cable through the conduit sleeve. A person who attaches a pull tape to a cable at one end of the sleeve needs to communicate to another person at the other end, regarding which pull tape to begin pulling through the conduit sleeve. This identification of cell could be accomplished in many ways, including color coding the cells or layers, printing, or color coding the seams. Further, an outer layer of the conduit sleeve may be marked in measured increments, such as feet or meters. The different layers forming the conduit may be different colors, for color-coding the cells. Alternatively, the pull tapes may be color coded to identify the cells. In a preferred embodiment, the pull tapes are marked in measured increments, which helps to identify how much cable will be needed for a particular job after the conduit sleeve is in place. In short, any suitable method may be employed to identify the cells and to meter the sleeves and/or pull tapes.

Therefore, the spirit and scope of the appended claims should not be limited to the description of the preferred versions contained herein. All features disclosed in this specification may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. A flexible textile conduit for fiber optic cables, coaxial cables and the like, said conduit comprising:
   at least two textile sleeve members connected and disposed in parallel relation; and
   each textile sleeve member having at least two cells for receiving one cable per cell.

2. The textile conduit set forth in claim 1, wherein a perforation is provided between each of said sleeve members, so that said sleeve members may be easily separated from each other.

3. The textile conduit set forth in claim 1, wherein a pull tape is disposed in each cell in slidable relation.

4. The textile conduit set forth in claim 3, wherein at least one of said pull tapes in each sleeve is marked in measured increments.

5. The textile conduit set forth in claim 3, wherein each of said pull tapes in a sleeve is printed or colored so that it may be distinguished from other pull tapes within said sleeve.

6. The textile conduit set forth in claim 1, wherein said structure is formed from at least two separate sheets of material.

7. The textile conduit set forth in claim 1, wherein said textile conduit is manufactured from material chosen from the group consisting of: a woven fabric, knit, non-woven, resin bonded scrim, plastic sheeting, weft insertion, or any combination thereof.

8. The textile conduit set forth in claim 1, wherein said sleeves and cells are biased toward an open celled, but transversely collapsible, configuration.

9. The textile conduit set forth in claim 1, wherein each said cell within a sleeve is marked so that it may be distinguished from other cells within said sleeve.

10. A method for producing flexible conduit liners for fiber optic cables, coaxial cables and the like, said method comprising the steps of:
    transporting at least three layers of textile material through a stitching device in a longitudinal direction;
    folding at least an upper or lower layer of said material prior to stitching to provide a plurality of sleeves having an expanded, but collapsible, cell configuration;
    sewing a plurality of seams along said material in said longitudinal direction so that said plurality of longitudinal sleeves is formed, thus providing at least two separate inner cells within each sleeve for receiving fiber optic cable and the like; and
    slitting said textile material in a longitudinal direction to separate any desired number of sleeves from the rest of said material.

11. The method set forth in claim 10, further including the step of rolling each individual sleeve onto a roll for storage and transport.

12. The method set forth in claim 10, wherein said textile material is chosen from the group comprising: a woven fabric, knit, non-woven, resin bonded scrim, plastic sheeting, weft insertions, or any combination thereof.

13. The method set forth in claim 10, further including the step of providing a plurality of pull cords or tapes in such a manner that one pull cord is slidably disposed within each cell of each said sleeve.

14. The method set forth in claim 13, wherein at least one of said pull tapes in each sleeve is marked in measured increments.

15. The method set forth in claim 13, wherein each of said pull tapes in a sleeve is printed or colored so that it may be distinguished from other pull tapes within said sleeve.

16. The method set forth in claim 10, wherein at least four layers of textile material are used, providing a plurality of sleeves each having at least three separate inner cells for receiving fiber optic cable and the like.

17. The method set forth in claim 10, further including the step of applying an adhesive between said seams to provide a finished selvage on either side of each sleeve after slitting.

18. The method set forth in claim 10, further including the step of thermally bonding said material between said seams to provide a finished selvage on either side of each sleeve after slitting.

19. The method set forth in claim 10, further including the step of using a hot knife for slitting said material.

20. The method set forth in claim 10, wherein each said cell within a sleeve is marked so that it may be distinguished from the other cells within said sleeve.

21. A method for producing flexible conduit sleeves for fiber optic cables, coaxial cables and the like, said method comprising the steps of:

providing at least three stacked layers of textile materials;

attaching said stacked layers together by creating a plurality of parallel, longitudinal seams, thereby creating a plurality of parallel, longitudinal sleeves, wherein each sleeve includes at least two separate inner cells;

providing a plurality of pull cords or tapes in such a manner that one pull cord is slidably disposed within each cell of each said sleeve; and separating any desired number of sleeves in a longitudinal direction into either individual sleeves or into sets of multiple sleeves.

22. The method set forth in claim 21, further including the step of rolling said individual sleeve or set of sleeves onto a roll for transport, storage or use.

23. The method set forth in claim 21, wherein said longitudinal seams are created by thermal bonding.

24. The method set forth in claim 21, wherein said longitudinal seams are created by applying an adhesive.

25. The method set forth in claim 21, wherein said textile material is chosen from the group comprising: a woven fabric knit, non-woven, resin bonded scrim, plastic sheeting, weft insertions, or any combination thereof.

26. The method set forth in claim 21, further including the step of folding at least an upper or lower layer of said material prior to creating said seams, to provide a sleeve having an expanded, but collapsible, cell configuration.

27. The method set forth in claim 21, wherein at least four layers of textile material are used, providing a plurality of sleeves each having at least three separate inner cells for receiving fiber optic cable and the like.

28. The method set forth in claim 21, wherein each said cell within a sleeve is marked so that it may be distinguished from other cells within said sleeve.

29. The method set forth in claim 21, wherein at least one of said pull tapes in each sleeve is marked in measured increments.

30. The method set forth in claim 21, wherein each of said pull tapes in a sleeve is printed or colored so that it may be distinguished from other pull tapes within said sleeve.

31. A method for producing flexible conduit liners for fiber optic cables, coaxial cables and the like, said method comprising the steps of:

transporting at least three layers of textile material through a stitching device in a longitudinal direction;

sewing a plurality of seams along said material in said longitudinal direction so that a plurality of longitudinal sleeves are formed, thus providing at least two separate inner cells within each sleeve for receiving fiber optic cable and the like;

providing a plurality of pull cords or tapes in such a manner that one pull cord is slidably disposed within each cell of each said sleeve; and slitting said textile material in a longitudinal direction to separate any desired number of sleeves from the rest of said material.

32. The method set forth in claim 31, further including the step of rolling each individual sleeve onto a roll for storage and transport.

33. The method set forth in claim 31, wherein said textile material is chosen from the group comprising: a woven fabric, knit, non-woven, resin bonded scrim, plastic sheeting, weft insertions, or any combination thereof.

34. The method set forth in claim 31, further including the step of folding at least an upper or lower layer of said material prior to stitching, to provide a sleeve having an expanded, but collapsible, cell configuration.

35. The method set forth in claim 31, wherein at least four layers of textile material are used, providing a plurality of sleeves each having at least three separate inner cells for receiving fiber optic cable and the like.

36. The method set forth in claim 31, further including the step of applying an adhesive between said seams to provide a finished selvage on either side of each sleeve after slitting.

37. The method set forth in claim 31, further including the step of thermally bonding said material between said seams to provide a finished selvage on either side of each sleeve after slitting.

38. The method set forth in claim 31, further including the step of using a hot knife for slitting said material.

39. The method set forth in claim 31, wherein each said cell within a sleeve is marked so that it may be distinguished from other cells within said sleeve.

40. The method set forth in claim 31, wherein at least one of said pull tapes in each sleeve is marked in measured increments.

41. The method set forth in claim 31, wherein each of said pull tapes in a sleeve is printed or colored so the it may be distinguished from other pull tapes within said sleeve.

* * * * *